(12) United States Patent
Parrott et al.

(10) Patent No.: US 11,673,746 B2
(45) Date of Patent: Jun. 13, 2023

(54) PICKING STATION WITH RETURN PROCESSING

(71) Applicant: Dematic Corp., Grand Rapids, MI (US)

(72) Inventors: Crystal Parrott, Helotes, TX (US); Kevin M. Heath, Clarksville, MI (US)

(73) Assignee: Dematic Corp., Grand Rapids, MI (US)

( * ) Notice: Subject to any disclaimer, the term of this patent is extended or adjusted under 35 U.S.C. 154(b) by 586 days.

(21) Appl. No.: 16/829,134

(22) Filed: Mar. 25, 2020

(65) Prior Publication Data

US 2020/0317450 A1 Oct. 8, 2020

Related U.S. Application Data

(60) Provisional application No. 62/829,728, filed on Apr. 5, 2019.

(51) Int. Cl.
| | |
|---|---|
| *B65G 1/137* | (2006.01) |
| *B65G 1/08* | (2006.01) |
| *B65G 9/00* | (2006.01) |
| *B65G 17/32* | (2006.01) |
| *G06Q 10/0837* | (2023.01) |

(52) U.S. Cl.
CPC ............. *B65G 1/1378* (2013.01); *B65G 1/08* (2013.01); *B65G 9/004* (2013.01); *B65G 17/32* (2013.01); *G06Q 10/0837* (2013.01); *B65G 1/1371* (2013.01); *B65G 2201/0238* (2013.01)

(58) Field of Classification Search
CPC ........ B65G 1/1378; B65G 1/08; B65G 9/004; B65G 17/32; B65G 1/1371; B65G 2201/0238; B65G 1/1373; G06Q 10/0837; G06Q 10/08; G06Q 50/28
See application file for complete search history.

(56) References Cited

U.S. PATENT DOCUMENTS

| 8,156,007 B1 * | 4/2012 | Anthony ................ G06Q 99/00 |
| | | 705/26.1 |
| 9,630,751 B1 | 4/2017 | Otto |
| 10,268,984 B1 * | 4/2019 | Ramoji ................ G06Q 10/087 |

(Continued)

FOREIGN PATENT DOCUMENTS

WO 2018162123 A1 9/2018

*Primary Examiner* — Thomas Randazzo
(74) *Attorney, Agent, or Firm* — Gardner, Linn, Burkhart & Ondersma LLP (57) ABSTRACT

A method and system for fulfilling customer orders having a data base that is adapted to store a plurality of customer orders and identity of warehouse inventory items and return inventory items that make up each of the customer orders. Some of the orders are single item orders with only one inventory item assigned to that order. Some of the orders are multiple item orders with multiple inventory items assigned to that order. Returned items that are processed and determined to be acceptable to be re-distributed are re-introduced into the inventory data base and are available to be assigned to an order. Warehouse inventory and return inventory are maintained independent of each other to reduce redundant operations. The order fulfilment system retrieves items from either or both of the warehouse inventory and return inventory to fulfil customer orders. The order fulfilment system may utilizes human associates or robot associates.

29 Claims, 11 Drawing Sheets

(56) References Cited

U.S. PATENT DOCUMENTS

| | | | |
|---|---|---|---|
| 2007/0150383 A1* | 6/2007 | Shakes | G06Q 10/0875 |
| | | | 705/29 |
| 2010/0198391 A1* | 8/2010 | Schafer | B65G 1/1378 |
| | | | 700/218 |
| 2018/0047006 A1* | 2/2018 | Johnson | G06Q 10/08 |
| 2018/0244473 A1 | 8/2018 | Mathi et al. | |
| 2018/0251303 A1* | 9/2018 | Mathi | B65G 17/20 |
| 2019/0233213 A1* | 8/2019 | Phan-Quiroga | B65G 1/0492 |
| 2020/0189846 A1* | 6/2020 | Sutter | B65G 47/38 |

* cited by examiner

PICKING STATION WITH RETURN PROCESSING

CROSS REFERENCE TO RELATED APPLICATION

The present application claims priority of U.S. provisional application Ser. No. 62/829,728 filed Apr. 5, 2019, which is hereby incorporated herein by reference in its entirety.

FIELD OF THE INVENTION

The present invention is directed generally to an order fulfillment method and a system for carrying out such method and, in particular, to such method and system that is useful for incorporating items from multiple inventories into an order.

BACKGROUND OF THE INVENTION

Order fulfillment of orders placed over the Internet must take place within a relatively short period of time in order to be commercially competitive. The same could be said for orders received by phone, facsimile, or by the mail based on catalog or television-based merchandising. Such order fulfillment is known as E-commerce and places demands on an order fulfillment system to meet such obligations. This is compounded by the fact that E-commerce usually involves a large number of small orders (each containing as few as one item in the order) that are selected from an inventory with a large number of potential items. E-commerce and business to consumer retailers also receive returned items. Acceptable returned items must also be processed and re-incorporated into the stored inventory such that they are available to be re-sold and incorporated into future orders.

Because of the large number of items or stockkeeping units (SKUs) from which an order may be selected, the inventory warehouse may be very large in footprint. As such, it is common to designate geographic portions of the inventory warehouse to store separate inventories, such as new stock inventory in one geographic portion and return inventory in another geographic portion. Each inventory to be accessed such that each inventory is capable of supplying at least a portion of each order. A sortation system or a picker at a pick station at each inventory location is directed by a warehouse management system to pick portions of a number of orders using a various picking technology known in the art. Each order may be contained in a number of picked receptacles if the order contains more than an individual item. However, it is then necessary to subsequently sort the contents of the picked receptacle(s) to the order and to process the items so that they can be packed-out for shipment via courier. Also, orders may be made up from only items that have been returned to the order fulfilment system, instead of with new inventory items.

SUMMARY OF THE INVENTION

The present invention is useful with a data base that is adapted to store a plurality of customer orders and identity of inventory items that make up each of the orders. Some of the orders are single item orders. Single item orders have only one inventory item assigned to that order. Some of the orders are multiple item orders. Multiple item orders have multiple inventory items assigned to that order. Returned items that are processed and determined to be acceptable to be re-distributed are re-introduced into the inventory data base and are available to be assigned to an order. The returned inventory items are stored independent of the warehouse inventory items to reduce redundant operations and to streamline the order fulfilment process.

An order fulfillment system and method, according to an aspect of the invention, includes an order fulfilment system having a warehouse storing new inventory items and a return processing system configured to receive, inspect and store returned items that are acceptable to be re-distributed or re-sold in future customer orders. The order fulfilment system data base provides order information to the warehouse to identify and retrieve a warehouse inventory item if required for the order. The order fulfilment system data base provides order information to the return processing system to identify and retrieve a return inventory item if required for the order. The order may be require only items that are stored in the return inventory, without the need to retrieve items from the warehouse to fulfil the customer order. If the order requires an item from both the warehouse inventory and the return inventory, the order fulfilment system releases both the warehouse inventory item and the return inventory so that they are both received at a picking station at the same time, such that a picking associate is able to pick the items at the same time into an order container. The simultaneous arrival of the warehouse inventory item and the return inventory item at the picking location reduces confusion for the associate, streamlines the utilization of a return goods into the order fulfilment process, and increases throughput of the entire order fulfilment system. Preferably, the order fulfilment system includes at least one computer with the data base to control the order fulfilment system.

According to one aspect of the invention, a picking station is provided for picking items from independent supply lines, such as one warehouse supply line and one return buffer supply line. The independent supplies lines may utilize different forms of transportation or conveyance to supply items to the pick station, such as roller conveyors, belt conveyors, pick carts, put carts, pouch conveyors, or the like. The independent supply lines are maintained independent of each other, such that they do not interfere with another supply line. The picking station receives items from each independent supply line at the picking station such that a picking associate is required to move either a minimal distance or no distance at all to perform picking functions at each independent supply line and to pick the items to an order container. Preferably, when an order requires at least two items, the picking station receives all of the items of that order at the same time, reducing the need for temporary storage or buffering of items for that order at the picking station.

According to one aspect of the invention, the return processing system includes a human good to person system, wherein a human associate is tasked with receiving the returned items, typically in a bulk container, such as a large Gaylord container. The human associate then selects a return item individually and inspects it to determine if it is acceptable to be re-distributed or re-sold to a customer. If the associate determines that the return item is acceptable for re-distribution, the associate places the return item into a return buffer storage system including individual conveyor containers. Preferably, the return buffer system includes a pouch conveyor having a plurality of pouches configured to store and transport an individual return inventory item. In an alternative aspect of the invention, the return processing system includes an automatic robot good to robot system, wherein a robot associate is tasked with performing all of the return item processes, including receiving the return items, inspecting the return items and validating them, and determining if they are acceptable to be re-distributed. If the robot determines that the return item is acceptable, the robot places the item into the return buffer conveyor containers, such as the conveyor pouch. Optionally, the return processing system further includes a 3D imaging system to inspect and validate return goods to determine if they are acceptable for redistribution. The 3D imaging system may include additional sensors, such as scales or scanners, to gather information, such as volumetric data or weight data, or an inventory item.

In one aspect of the invention, the return buffer pouch conveyor includes a plurality of automatically opening pouches that are capable of being opened automatically to release the contents within the pouch. The automatic pouches may drop the contents to a conveyor below the pouch. Preferably, the picking station of the order fulfilment system includes a ramp, slide, or chute disposed underneath the pouch conveyor that is directs the dropped inventory item from the pouch into an order container. The ramp removes the need for a picking associate to pick the contents of the bag and then put it in the order container, thereby increasing efficiency and throughput.

In one aspect of the invention, the warehouse includes an automated inventory retrieval system, such as a shuttle based automated warehouse system or the like, that automatically retrieves inventory items stored in the warehouse and transports the items to either a sortation system or directly to a picking station. Preferably, the inventory retrieval system transports the warehouse inventory items in totes, however, the inventory retrieval system may use boxes, bags, pouches, gaylords, or the like to transport warehouse inventory items to the required location.

According to one aspect of the invention, a warehouse sortation system is provided to retrieve, sort and transport warehouse inventory items. The warehouse sortation system may utilize a roller conveyor system, a pouch conveyor, a belt conveyor, or similar conveyance system to sort and transport inventory items. The warehouse sortation system is capable of retrieving a plurality of warehouse inventory items that make up a single customer order, to sort the plurality of items, and to release and transport the items making up a single order to the picking station at one time or, optionally, in one transport container. Optionally, the warehouse sortation system may utilize a manual goods to person system wherein a human associate picks items from totes and puts them into an order container or onto another conveyance system to be transported to the picking station. Preferably, the warehouse sortation system utilizes an automatic goods to robot system wherein a robot associate picks items from totes and puts them into an order container or onto another conveyance system to be transported to the picking station.

Therefore, the present invention provides a method and system for fulfilling customer orders that utilizes returned items that are available to fulfil at least a portion of the customer order. Some of the orders are single item orders with only one inventory item assigned to that order. Some of the orders are multiple item orders with multiple inventory items assigned to that order. Returned items that are processed and determined to be acceptable to be re-distributed are re-introduced into the inventory data base and are available to be assigned to a customer order. The order fulfilment method and system provide a streamlined order fulfilment process capable of incorporating and compiling new warehouse inventory and return inventory. The order fulfilment system and method maintain the warehouse inventory and the return inventory independent of each other to reduce redundant operations, such as replacing the returned items back into warehouse storage along with the new inventory. The order fulfilment system may utilizes human associates or robot associates to manually or automatically fulfil customer orders.

These and other objects, advantages, purposes, and features of the present invention will become more apparent upon review of the following specification in conjunction with the drawings.

DESCRIPTION OF THE PREFERRED EMBODIMENTS

Figure 1:
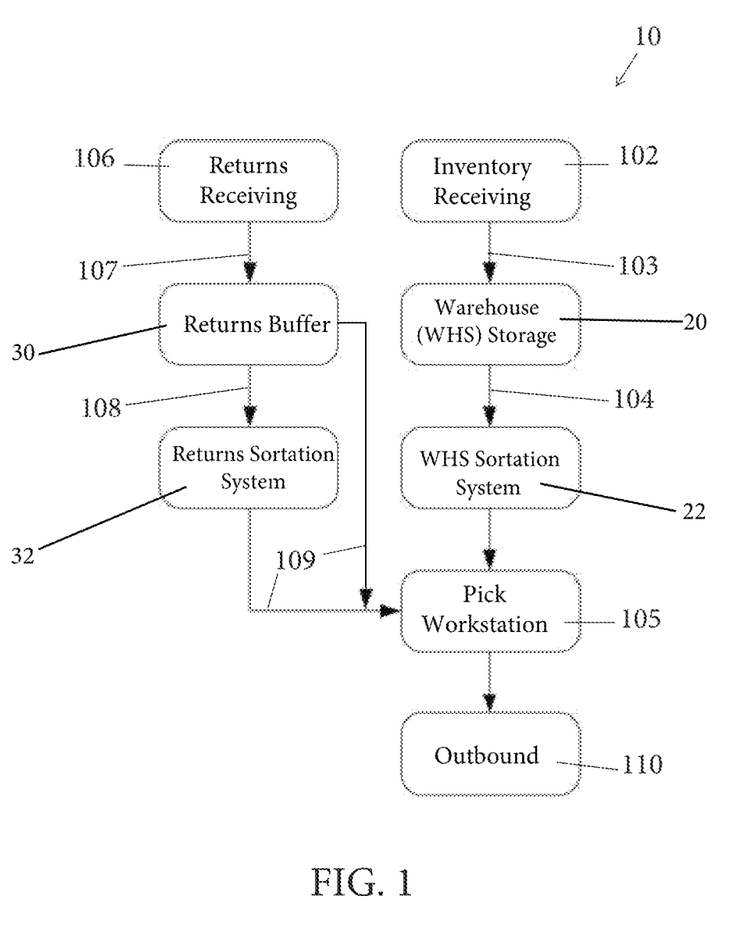
FIG. 1 is a block diagram of an order fulfilment system and method of operation according to an embodiment of the present invention.
Figure 2:
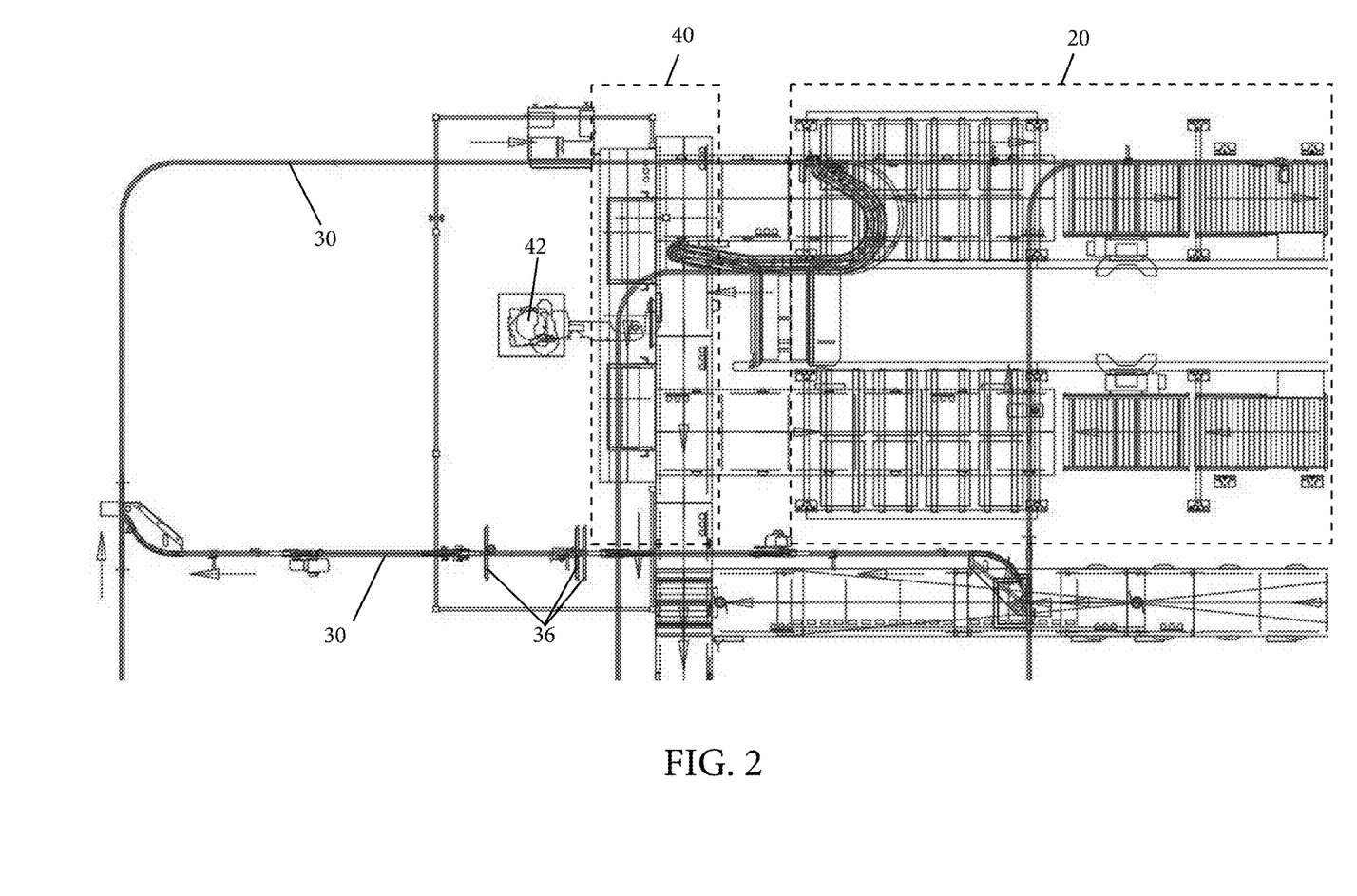
FIG. 2 is a top plan view of an order fulfilment system in accordance with the present invention.

Referring now to the drawings and the illustrative embodiments depicted therein, in one embodiment of the present invention, an order fulfillment method for operating an order fulfilment system 10 to fulfil customer orders receives (102) bulk inventory items that are inducted (103) into a warehouse 20 as warehouse inventory in an order fulfilment data base (FIGS. 1 and 2). The warehouse 20, includes an automated inventory retrieval system, such as a shuttle based automated warehouse system or the like, which may then supply (104) warehouse inventory items to a warehouse sortation system 22 by a bulk flow conveyor or by other means such as inventory totes, put carts or the like and identifies warehouse inventory items by using a bar code scanner, RFID scanner, optical recognition or the like (FIG. 1). The scanned warehouse inventory item is matched with an order (105) at an order pick station 40, such as by applying the SKU of the warehouse inventory items to the data base, which is adapted to store a plurality of customer orders and identity of inventory items that make up each of the orders. Some of the orders may be a single item order having only one inventory item SKU assigned to that order and some of the orders may be multiple item orders having multiple inventory items assigned to that order.

The method is useful with a warehouse sortation system 22 that is adapted to combine warehouse inventory items together that make up an order. Additionally, the method is useful with a return sortation system 32 that is adapted to receive return inventory items from a return buffer storage 30 and incorporate them into an order. The method is further useful with an order fulfilment system 10 that is adapted to combine inventory items from both a warehouse 20 and a return buffer storage 30 together that make up an order.

The method includes receiving (106) a plurality of returned items that have previously shipped to a customer and been returned by that customer at an order fulfilment system 10 which may then be inspected to determine if the returned items are acceptable to be re-distributed or sold. Returned items that are determined to be acceptable for re-sale are then loaded into a transport container, such as a conveyor pouch, and stored (107) in a return buffer 30, such as a pouch conveyor buffer, as return inventory to be accessed and incorporated into customer orders when required. The method may then sort (108) return inventory items from the return buffer 30 with a return sortation system 32 combined with the return buffer 30 to compile or sort return inventory items in multiple pouches into a specific order. The method matches (109) return inventory items either from the returns sortation system 32 or directly from the returns buffer 30 at the order picking station 40, such as by applying a unique pouch code of the pouch containing the inventory items to the data base that is adapted to store a plurality of customer orders and identity of all inventory items, including warehouse inventory items and return inventory items, that make up each of the orders.

In one embodiment, a method determines, based on inventory information from the data base, whether an order item is available in the return buffer 30, and if so, accesses the order item from the return buffer 30 and matches it with the order. If the method determines that the order item is not available in the return buffer 30, it accesses the order item from the warehouse 20 and matches it with the order. The matched inventory items of the order are released to the order pick station 40 and are picked into an order container 50 by a human or robotic picking associate 42 to fully or partially fulfil an order. Order containers 50 may be selected from boxes, totes, bags, or the like. Preferably, the fulfilled order is packed and distributed to a courier (110) to be delivered to a customer.

Figure 3:
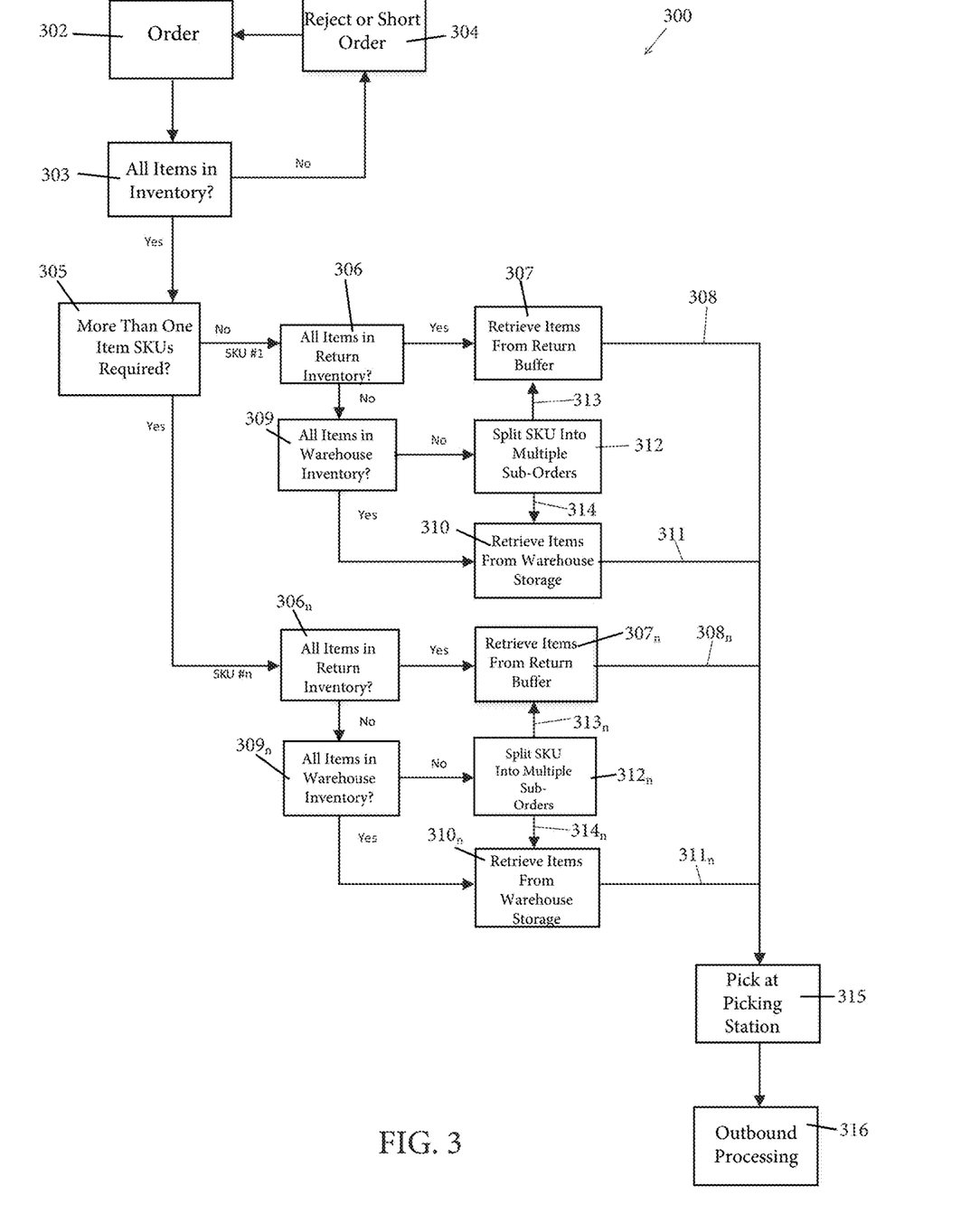
FIG. 3 is a block diagram of an order fulfilment method of operation of an order fulfilment system according to an embodiment of the present invention.

In one embodiment, a method 300 fulfils a customer order, wherein the customer order may contain only one item, may contain multiple items that are all the same item, or may contain multiple items with multiple unique items making up the order (FIG. 3). Method 300 receives order information (302) from the data base and determines (303) whether all items required for the order are in the overall inventory. If all of the items are not in the overall inventory, the order is rejected or shorted (304) and is returned to the data base to be processed later. If all items are available in the overall inventory, method 300 determines (305) whether the order contains more than one unique item, such as by determining that more than one unique SKU is included in the order. If the order contains only one unique SKU, which may be a single item order with that SKU, or a multiple item order requiring more than one item having that unique SKU, method 300 determines (306) whether all of the required items of that SKU are available in the return item buffer 30 and return item inventory. If the return item buffer 30 does contain all of the required items of that SKU, method 300 retrieves (307) the required items from the return buffer 30 and supplies them (308) to the picking station 40. If the return item buffer 30 does not contain all of the required items of that SKU, method 300 determines (309) whether all of the required items of the SKU are available in the warehouse 20 and warehouse inventory. If the warehouse 20 does contain all of the required items of that SKU, method 300 retrieves (310) the required items from the warehouse 20 and supplies them (311) to the picking station 40. If the warehouse 20 does not contain all of the required items of that SKU, method 300 splits (312) the order into multiple sub-orders and retrieves (313) a portion of the required items of that SKU from the return buffer 30 and supplies (308) them to the picking station 40. Then, method 300 retrieves (314) the remainder of the required items of that SKU that were not available in the return buffer 30 from the warehouse 20 and supplies (311) them to the picking station 40. At the picking station 40, method 300 picks (315) the items to an order container 50 and then packs and transfers the order for outbound processing (316).

If method 300 determines (305) that the order requires more than one unique item, such as two items with different SKUs, method 300 splits the unique SKUs of the required items of the order and starts the picking process for a first SKU at (306). Each additional unique SKU, "SKUn" begins the picking process at (306)$n$ and method 300 then performs steps (306)$n$ through (314)$n$ for each unique item SKUn. At the picking station 40, method 300 picks (315) the items from each unique SKUn to an order container 50 and then packs and transfers the order for outbound processing (316).

In one embodiment, the warehouse sortation system 22 includes a pick station 44 that receives goods from the warehouse 20 to be picked by a human or robotic associate from a product container 48 to an order container 50 to be transported to the order picking station 40 to fulfil a customer order. Pick station 44 automatically substitutes product containers 48 and order containers 50 as needed to fulfil orders. In another embodiment, the return sortation system 32 includes a pick station 44 that receives goods from the return buffer 30 to be picked by a human or robotic associate from a product container 48 to an order container 50 to be transported to the order picking station 40 to fulfil a customer order. The pick station 44 automatically substitutes product containers 48 and order containers 50 as needed to fulfil orders.

In another embodiment, the order picking station 40 includes a pick station that may receive warehouse inventory items, return inventory items, or both warehouse and return inventory items, to a human or robotic associate to pick into order containers 50 to fulfil a customer order. An exemplary pick station is described in commonly assigned U.S. Pat. Nos. 8,713,899 and 9,604,781, the disclosures of which are hereby incorporated herein by reference. Further alternative embodiments of pick stations may include a goods to person (GTP) system, such as a one-to-one GTP system or a one-to-many GTP system, or may include a goods to robot (GTR) system, such as a one-to-one GTR system, or a one-to-many GTR system.

Figure 4A:
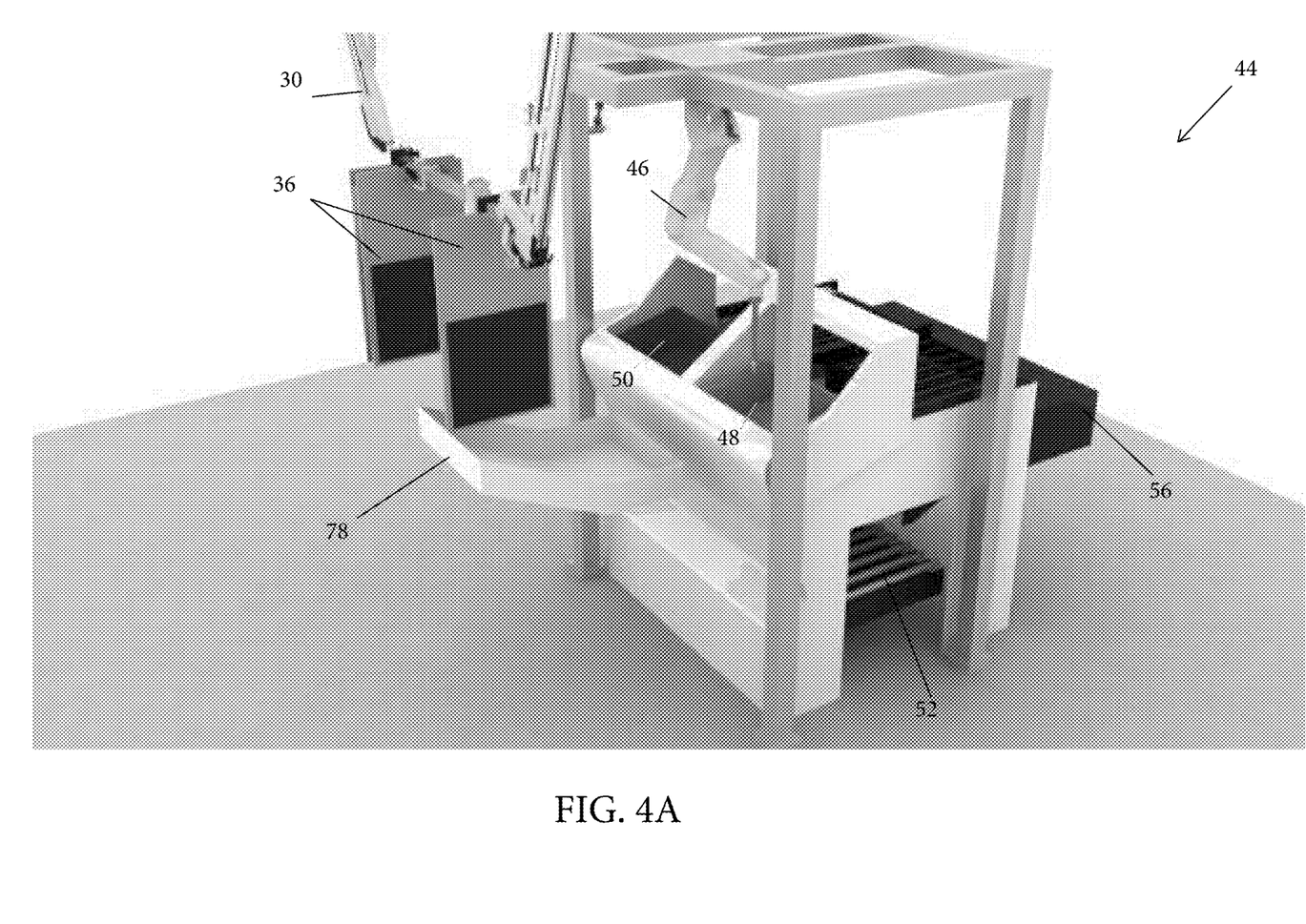
FIGS. 4A-4B are generally opposite perspective views of an embodiment of an order fulfilment station of an order fulfillment system.
Figure 4B:
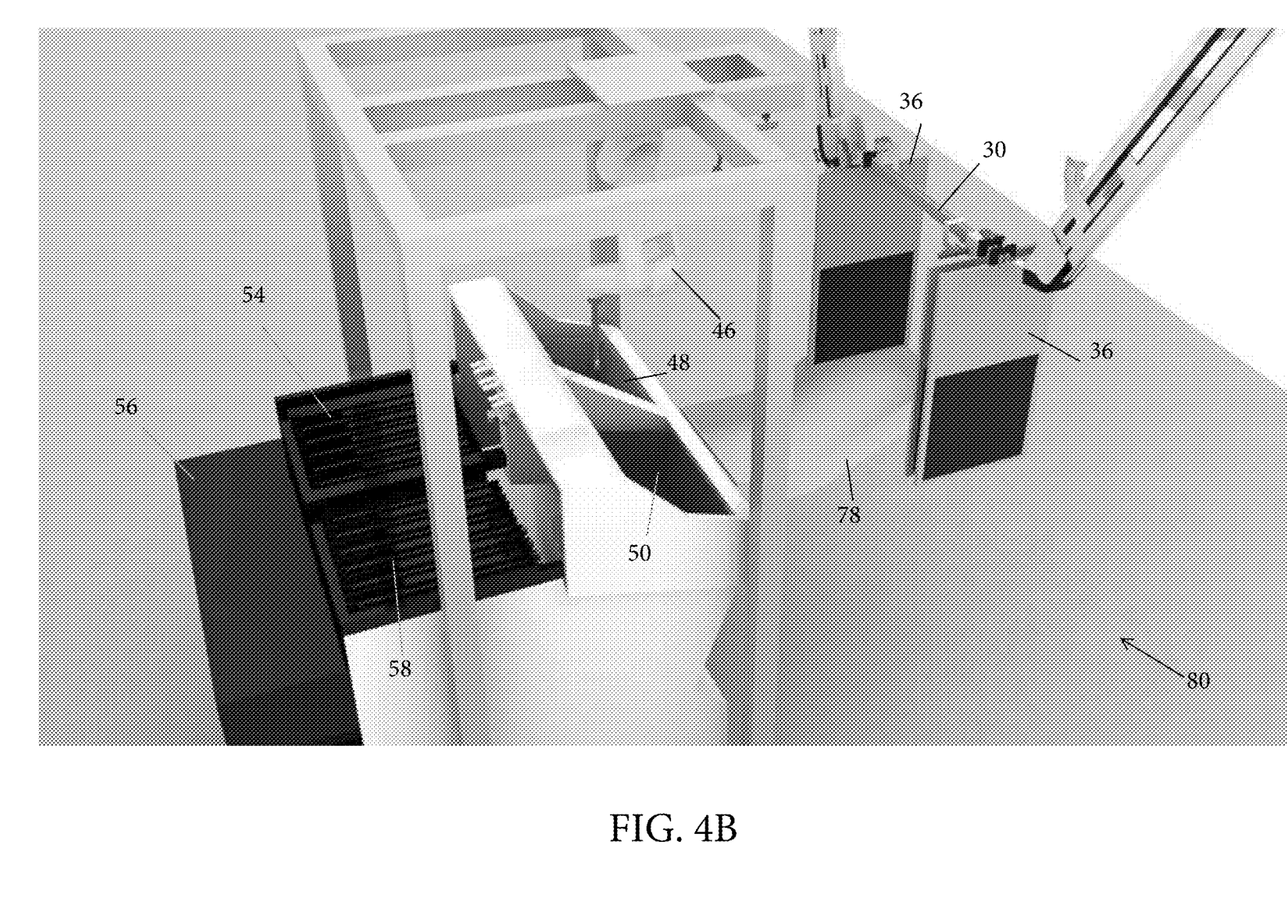
Figure 5A:
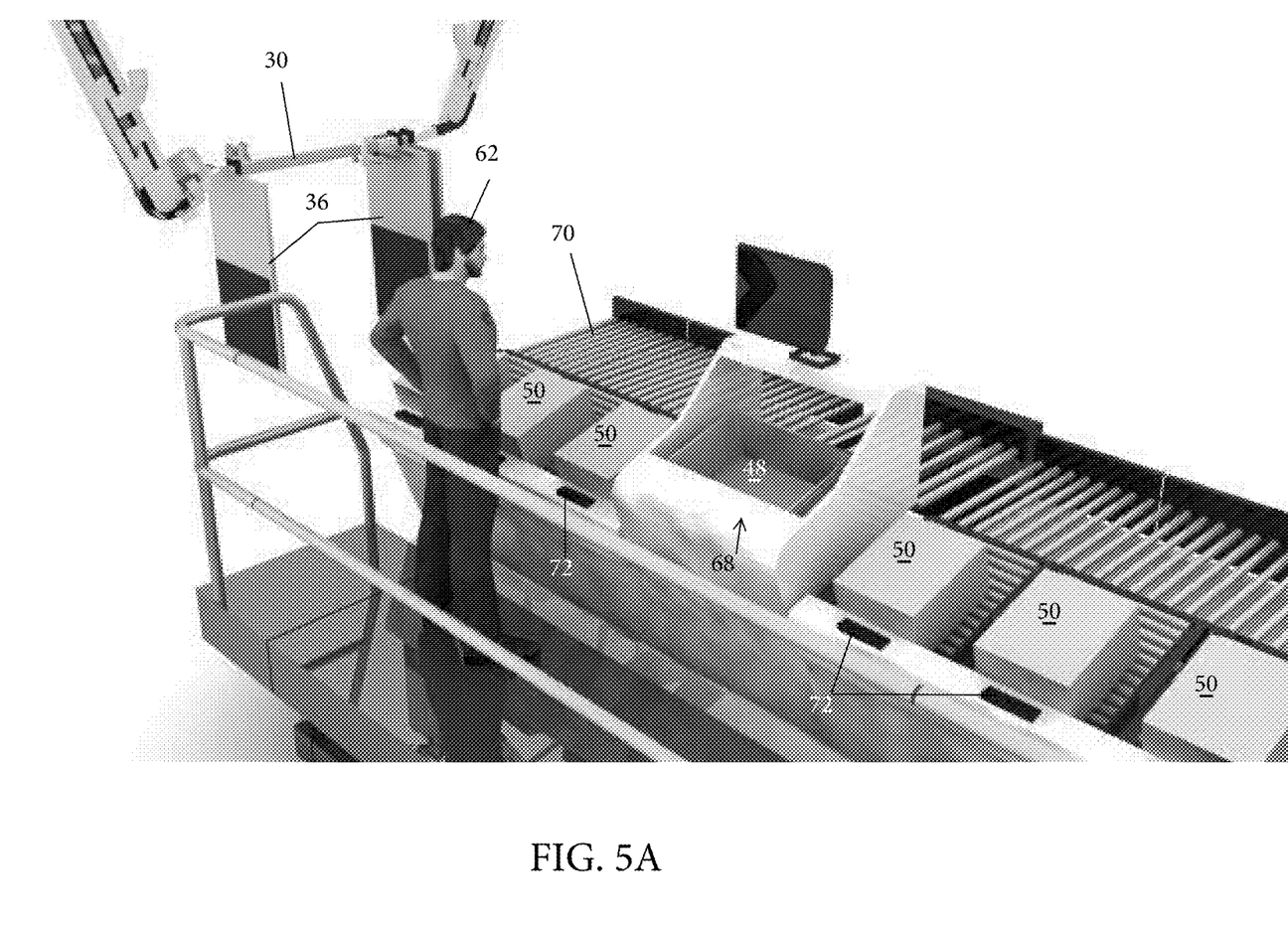
FIGS. 5A-5B are generally opposite perspective views of an alternative embodiment of an order fulfilment station of an order fulfillment system.
Figure 5B:
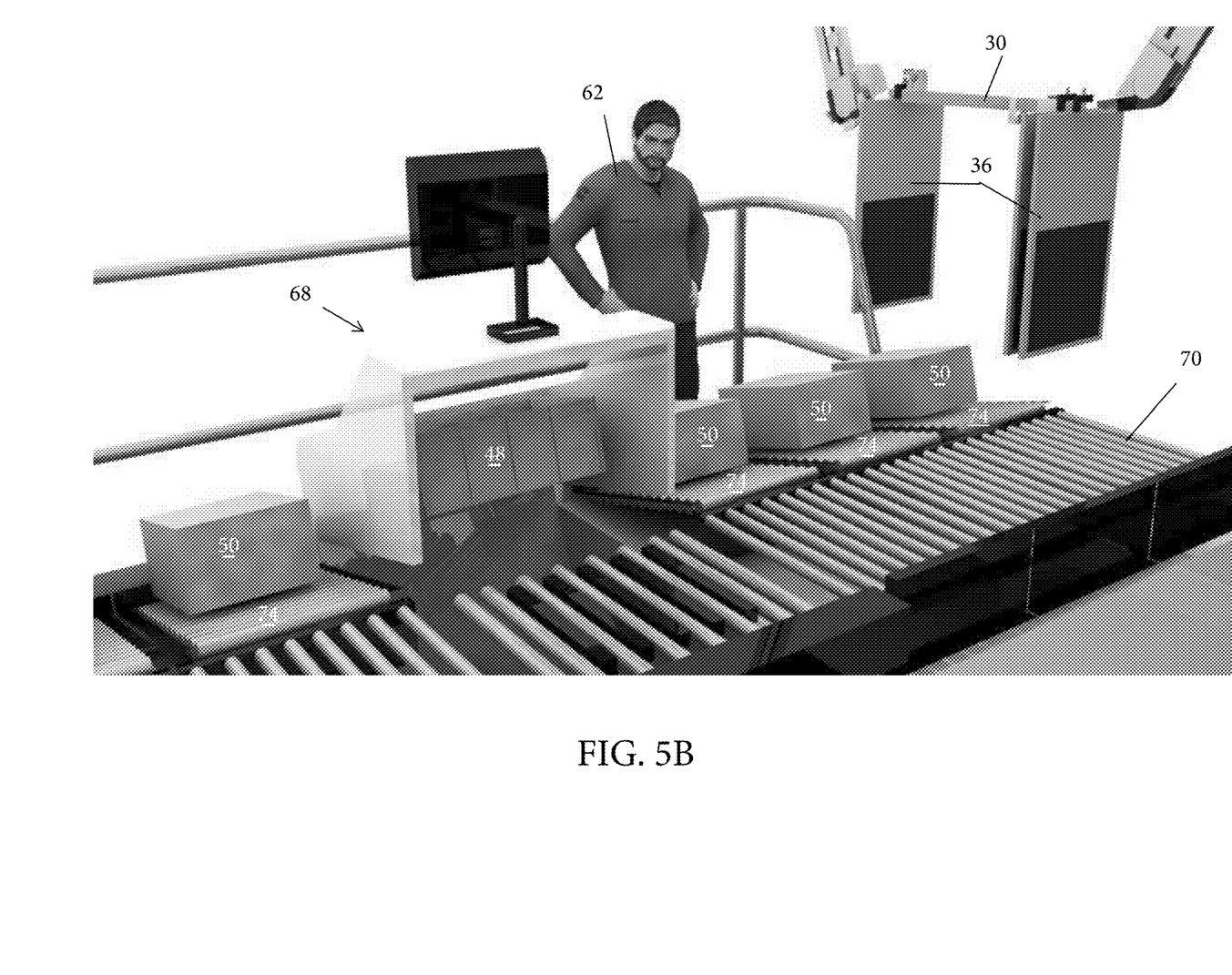
Figure 6A:
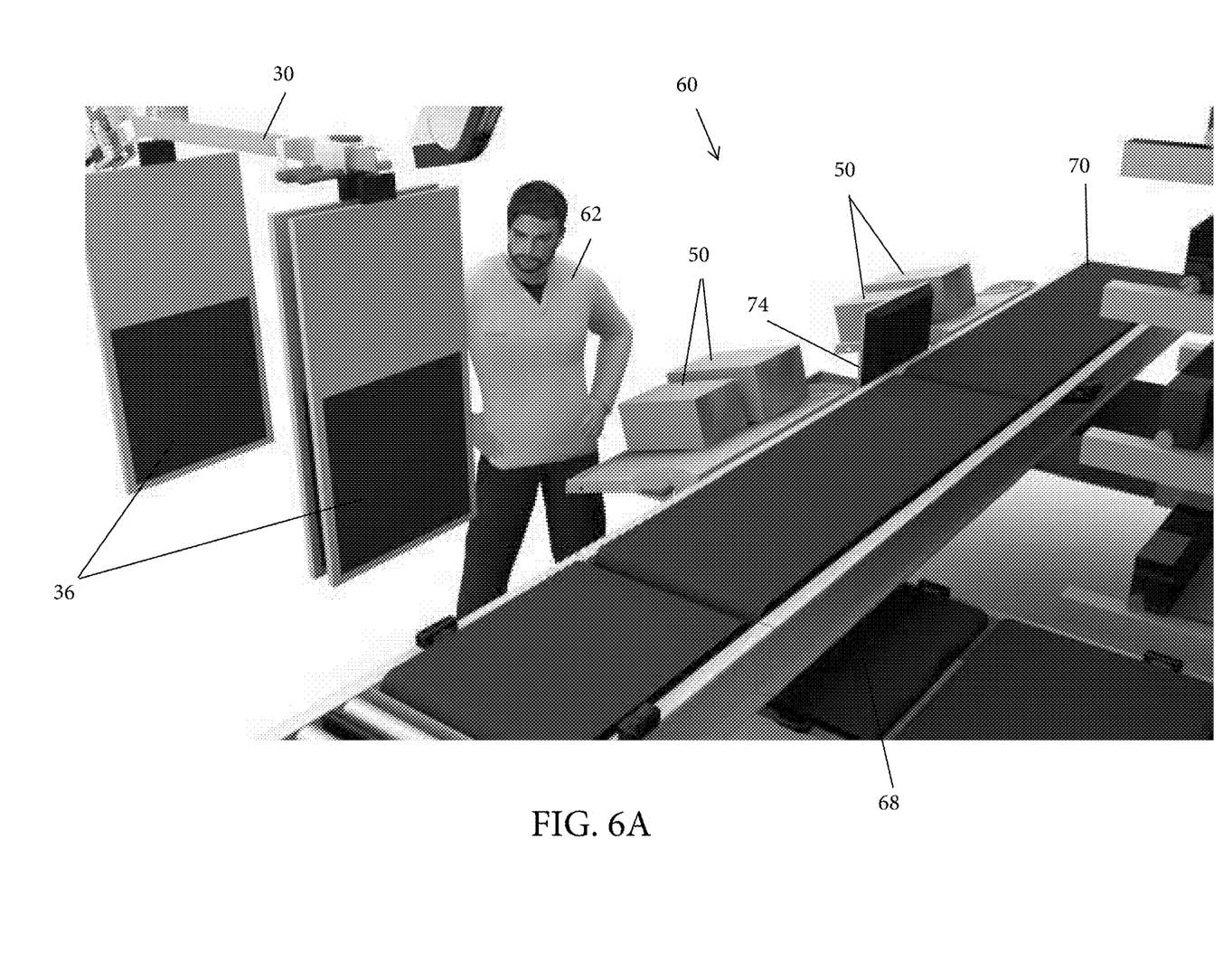
FIGS. 6A-6B are generally opposite perspective views of an alternative embodiment of an order fulfilment station of an order fulfillment system.
Figure 6B:
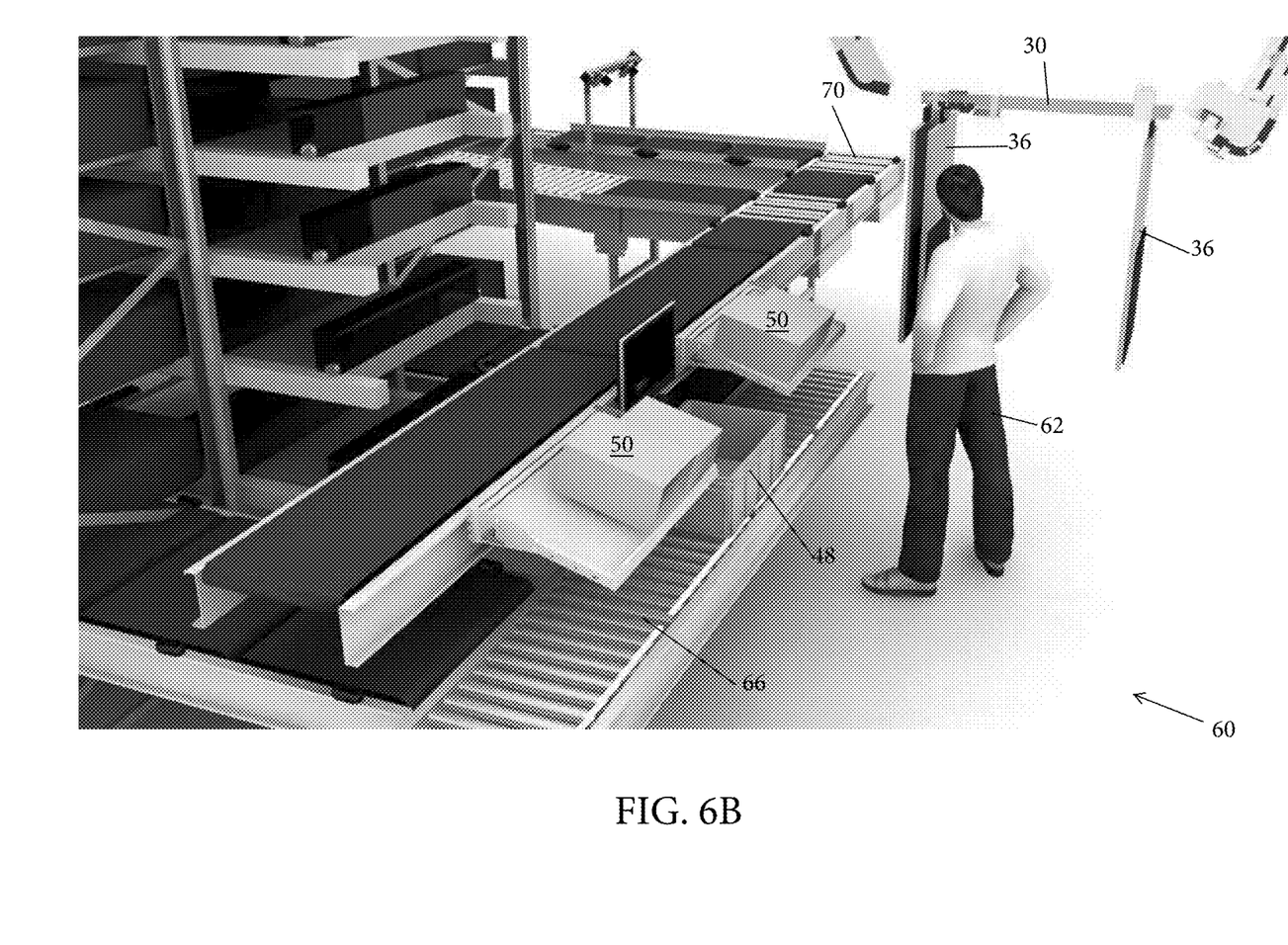

In one embodiment, the picking station 40 of the order fulfilment system 10 utilizes a goods to robot (GTR) station 44 to fulfil customer orders, wherein a robot associate 46 performs the picking functions from an inventory product container 48 to an order container 50 (FIGS. 4A and 4B). The GTR picking station 44 and a method of picking goods from the product container 48 and loading the goods in an order container 50, includes a product container-handling line 52 adapted to supply the product container 48 to a product container-handling mechanism 54, wherein the product container-handling mechanism 54 is adapted to supply a product container 48 to a pick area and an order container-handling line 56 is adapted to supply an order container 50 to an order container-handling mechanism 58, wherein the order container-handling mechanism 58 is adapted to supply an order container 50 to the pick area.

Optionally, in one embodiment, the order container supply system includes an order container sequencer (not shown) that is adapted to arrange order containers 50 in a particular sequence prior to supplying the order containers 50 to the order container-handling mechanism 58. This relieves constraint on operation of container storage 20 system which greatly increases the throughput of container storage system 20 and, hence, picking system 44.

In another embodiment, the picking station 40 of the order fulfilment system 10 utilizes a goods to person (GTP) station 60 to fulfil customer orders, wherein a human associate 62 performs the picking functions from a product container 48 to an order container 50 (FIGS. 5A-6B). The GTP picking station 60 and a method of picking goods from the product container 48 and loading the goods in an order container 50, includes a product container-handling line 66 adapted to supply the product container 48 to a product container-handling mechanism 68, wherein the product container-handling mechanism 68 is adapted to supply a product container 48 to a pick area and an order container-handling line 70 is adapted to supply an order container 50 to an order container-handling mechanism 74, wherein the order container-handling mechanism 74 is adapted to supply an order container 50 to the pick area to be loaded with a picked item by the associate 62.

In one embodiment, the order container supply system includes an order container sequencer 72 that is adapted to arrange order containers 50 in a particular sequence prior to supplying the order containers 50 to the order container-handling mechanism 74. This allows the GTP system 60 to supply order containers 50 in any order, such as a random order. This relieves constraint on operation of container storage 20 system which greatly increases the throughput of the order fulfilment system 10.

In one embodiment, return items determined to be suitable for re-sale are re-introduced into the overall inventory as return inventory items. The return inventory items are individually loaded into the return buffer 30. In one embodiment, the inventory buffer 30 is a pouch conveyor configured to transport conveyor pouches 36 such as disclosed in commonly assigned U.S. Pat. No. 10,329,089, the disclosure of which is hereby incorporated herein by reference. However, it will be appreciated that other types of item transport containers may be used, such as totes, boxes, or the like. An individual return inventory item is placed into an individual pouch 36 and is stored in the return buffer 30 until it is required for a customer order. The data base identifies the inventory item and tracks the inventory item and its pouch 36, such as by a unique pouch identification code or SKU that is linked in the data base to item information of the item stored in the pouch 36. In the illustrated embodiment, the return buffer 30 is maintained independent of the warehouse 20 (FIG. 1).

Figure 7A:
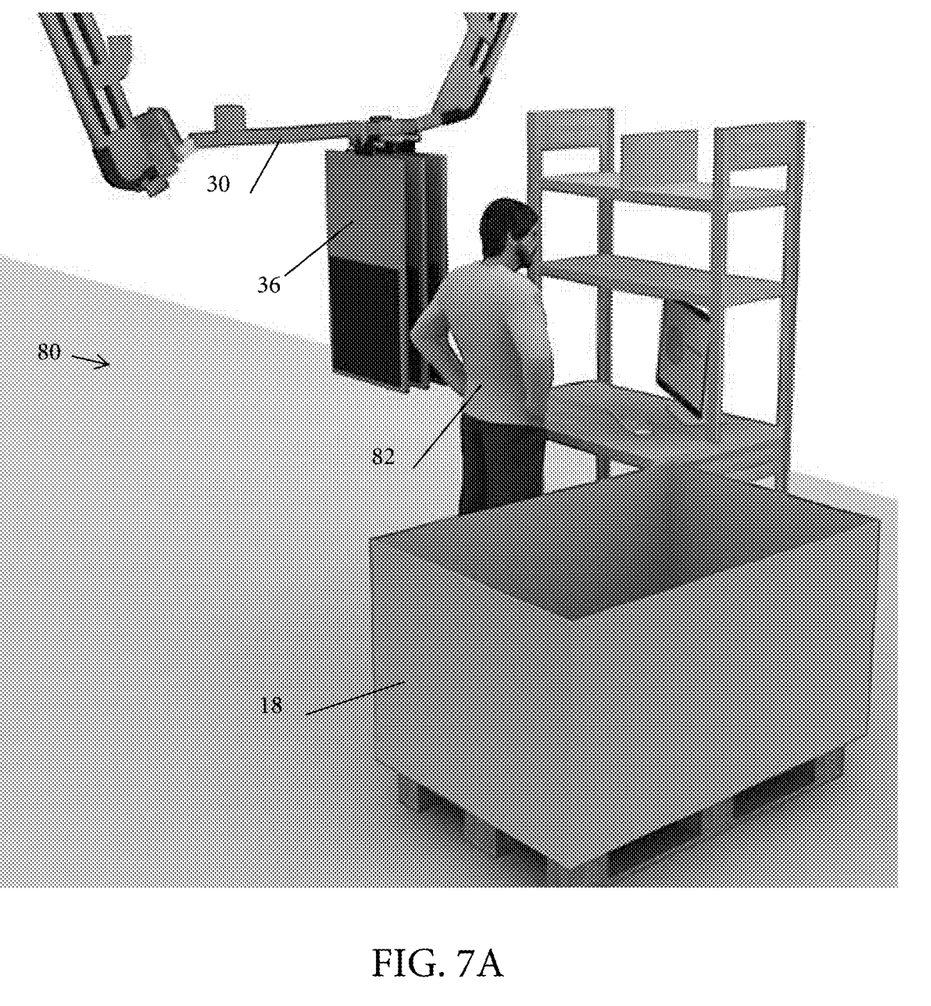
FIGS. 7A-7B are generally opposite perspective views of an alternative embodiment of a returns processing station of an order fulfillment system.
Figure 7B:
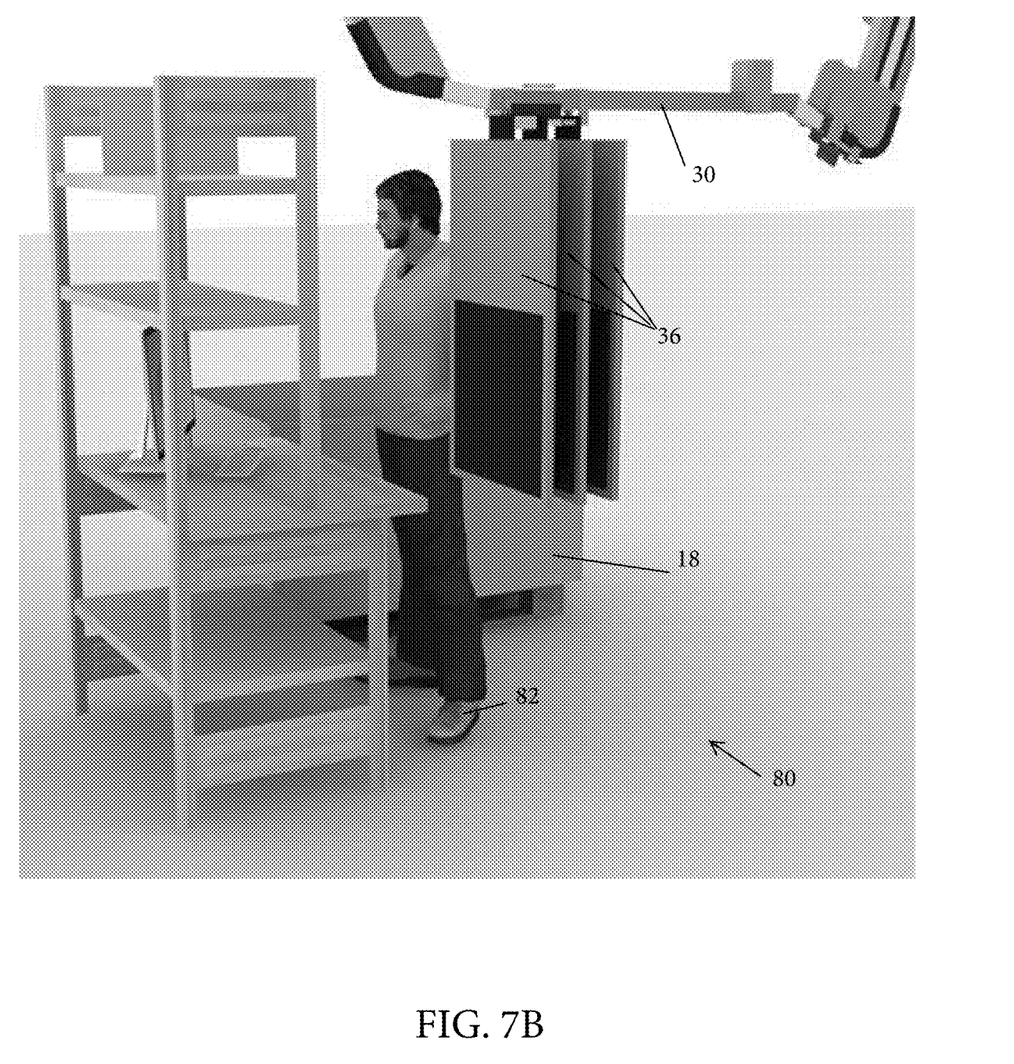

Optionally, in one embodiment, as illustrated in FIGS. 7A and 7B, a return processing system 80 receives returned items that are delivered to the order fulfilment system 10 from a common carrier. The returned items arrive in bulk containers 18, such as large gaylord containers. An associate with the return processing system individually retrieves returned items from the gaylord 18 and inspects them to determine if the returned item is suitable or acceptable to be re-introduced into the overall order fulfilment system 10 inventory to fulfil later customer orders. The returned items that are acceptable to be re-distributed are loaded into conveyor container, such as a conveyor pouch 36, and enter into the return buffer 30. Optionally, returned items are delivered to the order fulfilment system 10 and placed in bulk onto a conveyor (not shown) that transports the return items to a bulk container 18 proximate a picking station or the return processing system, wherein an associate individually selects each return item from the container 18 and inspects it and determines if it should be placed in a conveyor pouch 36 to enter the return buffer 30. Preferably, the return processing associate is an automatic robot associate, however, a human associate 82 may manually perform the picking functions at the return processing system 80.

In one embodiment, the return processing system 80 is a manual GTP system wherein the returned items are received, retrieved, inspected, and placed in conveyor pouches 36 manually at a manual return picking station having a human picking associate 82 that performs all of the return processes to sort and re-introduce returned items into the overall inventory data base of the order fulfilment system 10 (FIGS. 7A and 7B). The associate of the manual return station manually retrieves a single return item from the bulk container 18, inspects the return item to identify and validate the returned item to determine if it is suitable for re-sale prior to loading into the conveyor pouches 36, and if suitable places the return item into a single conveyor pouch 36.

In one embodiment, the return processing system 80 is an automatic GTR system wherein returned items are received, retrieved, inspected, and placed in conveyor pouches 36 automatically with an automated return picking station having a picking robot (not shown) that performs all of the return processes to sort and re-introduce returned items into the overall inventory data base of the order fulfilment system 10. The automated return station may utilize a 3D imaging system (not shown) to identify and validate returned items to determine if they are suitable for re-sale prior to loading into the conveyor pouches 36. An exemplary 3D imaging system is disclosed in commonly assigned U.S. patent application Ser. No. 16/575,803, the disclosure of which is hereby incorporated herein by reference.

In one embodiment, the return buffer 30 may include a pouch conveyor including conveyor pouches 36 that are capable of automatically releasing their contents and an automatic conveyor bag opener to automatically open the automatic conveyor pouches 36, such as disclosed in commonly assigned U.S. Pat. No. 9,630,751, the disclosure of which is hereby incorporated herein by reference. Optionally, in such a configuration, an item chute or ramp 78 is provided subjacent to the conveyor pouch 36 when the conveyor pouch is automatically opened to release its contents (FIGS. 4A and 4B). The chute 78 directs the released content into an order container 50 without needing to be picked by an associate. The ramp 78 may be included with the warehouse sortation system 22, the return sortation system 32, and the picking station 40.

In one embodiment, a method for operating an order fulfilment system 10 to fulfil customer orders includes receiving customer order information from a data base of the order fulfilment system 10 for an order that requires inventory items from both the warehouse inventory and the return inventory, accessing the warehouse inventory items with the warehouse sortation system 22, accessing the return inventory items with the return sortation system 32, releasing and transporting the warehouse inventory items from the warehouse sortation system 22 to the picking station 40, releasing and transporting the return inventory items from the return sortation system 32 to the picking station 40, receiving the warehouse inventory items and the return inventory items at the picking station 40 at the same time, and picking the items, into an order container 50. The order in the order container 50 may be then transported to a carrier for delivery to the customer. A control system of the order fulfilment system 10 releases the items from their respective sortation systems 22, 32 such that they are transported independently and arrive at the picking station 40 at the same time. For example, if two items are required for an order, and one of the two items is available in the return sortation system 32 and the other item is only available in the warehouse sortation system 22, then the control system will release the item from the return system 32 and release the item from the warehouse system 22 such that both items arrive at the picking station 40 together, simultaneously. The simultaneous timing of the items arrival at the picking station 40 reduces associate confusion and reduces associate picking time that the associate would otherwise spend determining which items belong to which customer order, thus increasing throughput of the order fulfilment system 10.

Accordingly, the method and system of fulfilling an order of the present invention provides a streamlined operation for incorporating return items that have been returned to an order fulfilment system into the inventory data base of the overall fulfilment system while maintaining the return items in a storage area separate of new inventory that is stored in a warehouse. The method includes determining if items required for an order are available in the return buffer and if so, retrieving those return inventory items to fulfil an order. If the return buffer does not contain the required order items, then retrieving those required items from the warehouse. The method transports the retrieved items, individually, from the return buffer and the warehouse, to a picking station to be compiled into an order. If required order items are retrieved from both the return buffer and the warehouse, the method ensures that the warehouse inventory items and the return inventory items arrive at the picking station at the same time to increase efficiency and throughput of the order fulfilment system while effectively utilizing the return items to fulfil an order.

As described herein, the disclosures of the above mentioned systems and methods disclosed in commonly assigned patent application U.S. patent application Ser. No. 16/575,803, filed Sep. 19, 2019, by Michael Khodl and Tim Post for a METHOD AND APPARATUS FOR CONTROLLING FLOW OF OBJECTS IN A MATERIAL HANDLING SYSTEM, and U.S. Pat. No. 8,713,899 issued May 6, 2014, to Hortig, et al. for a GOODS-TO-PERSON PICKING STATION AND PICKING METHOD, U.S. Pat. No. 9,604,781 issued Mar. 28, 2017, to Stevens, et al. for a PICKING STATION WITH AUTOMATIC WAREHOUSE, U.S. Pat. No. 9,630,751 issued Apr. 25, 2017, to Otto. for a TRANSPORT BAG, A CONVEYING APPARATUS AND A METHOD FOR OPENING OR CLOSING A TRANSPORT BAG, and U.S. Pat. No. 10,329,089 issued Jun. 25, 2019, to Kasper et al. for an ORDER FULFILLMENT SYSTEM AND METHOD WITH SORTATION AT INDUCT, are hereby incorporated herein by reference in their entireties.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property is claimed are defined as follows:

1. A method of fulfilling an order incorporating return inventory items, comprising:
   storing a plurality of customer orders, warehouse inventory item information, and return inventory item information in a data base;
   storing a plurality of warehouse inventory items in a warehouse wherein the warehouse inventory items are available to be incorporated into the customer orders, each of said warehouse inventory items comprising a unique item identifier that is known by the data base;
   storing a plurality of returned items in a return item buffer as return inventory items, wherein the return inventory items and are available to be incorporated into the customer orders, each of said return inventory items comprising a unique item identifier that is known by the data base;
   determining with the data base if a return inventory item matches an item required for a customer order;
   if a return inventory item matches with the customer order, transporting the matching return inventory item with a return conveyor from the return item buffer to a picking station;
   if a return inventory item does not match the customer order, matching with the data base a warehouse inventory item with the customer order and transporting the matching warehouse inventory item with a transportation system from the warehouse to the picking station; and
   if a return inventory item matches with the customer order and that customer order also requires a warehouse inventory item, releasing the warehouse inventory items and the return inventory items to arrive at the picking station at the same time to be picked into the same order, and picking the warehouse inventory items and the return inventory items together that make up the same order.

2. The method of claim 1, wherein the customer order includes a plurality of inventory items that are selected from at least one chosen from the return item buffer and the warehouse.

3. The method of claim 1, wherein the returned items are received at a return processing system, the return processing system receiving the plurality of returned items at the warehouse, a return associate inspecting the plurality of returned items, determining if the returned items are acceptable for resale, and loading the acceptable returned items into a conveyor container of the return item buffer.

4. The method of claim 1, wherein said warehouse comprises an automated inventory retrieval system.

5. The method of claim 1, wherein said picking station comprises a manual goods to person system, wherein a human associate manually picks inventory items into an order.

6. The method of claim 1, wherein said picking station comprises an automatic goods to robot system, wherein a robot associate automatically picks inventory items into an order.

7. The method of claim 1, wherein at least one item chosen from said return item buffer and said return conveyor comprises a pouch conveyer configured to convey a plurality of pouches, each pouch configured to transport at least one item.

8. The method of claim 7, wherein said pouches further comprise automatic openers configured to automatically open the pouch and release the item contained within the pouch.

9. The method of claim 8, wherein said picking station comprises an item chute disposed subjacent of the automatic opener of the pouch conveyor to receive and direct the released item to an order container, such that no associate is required to pick the item from the pouch to the order container.

10. The method of claim 1, further comprising an automatic returns processing system configured to perform steps of receiving the plurality of returned items at the warehouse, inspecting the plurality of returned items, determining if the returned items are acceptable for resale, and placing the acceptable return items into storage in a product container in the return buffer.

11. The method of claim 10, wherein said automatic returns processing system comprises a robot associate configured to perform the recited steps.

12. The method of claim 10, wherein said automatic return processing system comprises a 3D imaging system to automatically identify, inspect and validate returned items to determine if they are suitable and acceptable for re-distribution.

13. A method of fulfilling an order incorporating return inventory, comprising:
   storing a plurality of customer orders, warehouse inventory item information, and return inventory item information in a data base;
   storing a plurality of warehouse inventory items in a warehouse wherein the warehouse inventory items are available to be incorporated into the customer orders, each of said warehouse inventory items comprising a unique item identifier that is known by the data base;
   storing a plurality of returned items in a return item buffer as return inventory items, wherein the return inventory items and are available to be incorporated into the customer orders, each of said return inventory items comprising a unique item identifier that is known by the data base;
   identifying warehouse inventory items withdrawn from the warehouse with its item identifier and applying the identity of each withdrawn warehouse inventory item to the data base and matching that warehouse inventory item with a customer order;
   combining warehouse inventory items together that make up an order with a sortation system, said sortation system having a sortation buffer that is adapted to accumulate individual warehouse inventory items and an accumulator that is adapted to receive individual warehouse inventory items from said sortation buffer when all or a portion of the warehouse inventory items that make up a multiple item order are in said sortation buffer;
   transporting warehouse inventory items with a transportation system from the sortation system to a picking station;
   identifying return inventory items withdrawn from the return item buffer with its item identifier and applying the identity of each withdrawn return inventory item to the data base and matching that return inventory item with a customer order;
   transporting return inventory items with a return conveyor from the item return buffer to the picking station;
   releasing the warehouse inventory items and the return inventory items such that they arrive at the picking station at the same time to be picked in the same order;
   compiling warehouse inventory items and return inventory items together that make up an order; and
   picking the compiled items to an order container.

14. The method of claim 13, wherein said return item buffer comprises a pouch conveyor configured to convey a plurality of pouches, each pouch configured to transport at least one item.

15. The method of claim 14, wherein said pouches further comprise automatic openers configured to automatically open the pouch and release the item contained within the pouch.

16. The method of claim 15, wherein said picking station comprises an item chute disposed subjacent of the automatic opener of the pouch conveyor to receive and direct the released item to an order container, such that no associate is required to pick the item from the pouch to the order container.

17. The method of claim 13, further comprising an automatic returns processing system having an associate at the returns processing system, the automatic returns processing system configured to perform steps of receiving the plurality of returned items at the warehouse, inspecting the plurality of returned items, determining if the returned items are acceptable for resale, and placing the acceptable return items into storage in the return buffer.

18. The method of claim 17, wherein said associate comprises a robot associate configured to perform the recited steps.

19. An order fulfillment system, comprising:
   a warehouse storing a supply of warehouse inventory items;
   a return item buffer configured to store each of a plurality of returned items as a return inventory item;
   a picking station configured to receive warehouse inventory items from the warehouse and return inventory items from the return buffer; and
   a computer system having a queue of customer orders,
   said computer system comprising a data base configured to store a plurality of customer orders, identifying information of the warehouse inventory items, and identifying information of the return inventory items;
   said computer system configured to determine if an item required for a customer order is stored in said return item buffer, and if the required item is in said return item buffer, retrieve the return inventory item from said return item buffer and supply that return inventory item to said picking station;
   said computer system further configured to retrieve the item required for the customer order from said warehouse if that required item was not in said return item buffer, and supply that warehouse inventory item to said picking station;
   said computer system configured to supply the warehouse inventory items and the return inventory items to said picking station such that they arrive at said picking station at the same time to be picked in the same order;
   said computer system configured to issue instructions to an associate at said picking station to pick an order by picking the required item and loading the required item to an order container.

20. The order fulfilment system of claim 19, wherein said warehouse comprises an automated inventory retrieval system.

21. The order fulfilment system of claim 19, wherein said picking station comprises a manual goods to person system, wherein a human associate manually picks inventory items into an order.

22. The order fulfilment system of claim 19, wherein said picking station comprises an automatic goods to robot system, wherein a robot associate automatically picks inventory items into an order.

23. The order fulfilment system of claim 19, wherein said return item buffer comprises a pouch conveyor configured to convey a plurality of pouches, each pouch configured to transport at least one item.

24. The order fulfilment system of claim 23, wherein said pouches further comprise automatic openers configured to automatically open the pouch and release the item contained within the pouch.

25. The order fulfilment system of claim 24, wherein said picking station comprises an item chute disposed subjacent of the automatic opener of the pouch conveyor to receive and direct the released item to the order container, such that no associate is required to pick the item from the pouch to the order container.

26. The order fulfilment system of claim 19, further comprising a return processing system configured to receive and inspect a plurality of returned items, to determine if the returned items are acceptable to be re-distributed in a future customer order, and to load acceptable returned items into a product container to enter said return item buffer.

27. The order fulfilment system of claim 26, wherein said return processing system comprises a 3D imaging system to automatically identify, inspect and validate returned items to determine if they are suitable and acceptable for re-distribution.

28. The order fulfilment system of claim 26, wherein said return processing system further comprises an automatic returns processing system configured to automatically receive plurality of returned items at the warehouse, automatically inspect the plurality of returned items, automatically determine if the returned items are acceptable for resale, and automatically load the acceptable return items into a product container to enter said return item buffer.

29. The order fulfilment system of claim 28, wherein said automatic returns processing system comprises a robot associate configured to process the returned items.

* * * * *